United States Patent
Tauchi et al.

(10) Patent No.: US 6,175,685 B1
(45) Date of Patent: Jan. 16, 2001

(54) RECORDING/REPRODUCING OF VIDEO SIGNALS, WITH VIDEO SIGNALS PLAYED BACK AS A FRAME OR A TWICE-OUTPUTTED SINGLE-FIELD DEPENDING ON WHETHER THE RECORDED SIGNALS ARE DIRECTED AS STILL OR MOVING PICTURES

(75) Inventors: Yoichiro Tauchi, Saitama; Yuka Kiyama, Tokyo; Kenji Nikata, Kanagawa, all of (JP)

(73) Assignee: Sony Corporation, Tokyo (JP)

( * ) Notice: Under 35 U.S.C. 154(b), the term of this patent shall be extended for 0 days.

(21) Appl. No.: 08/991,357

(22) Filed: Dec. 16, 1997

(30) Foreign Application Priority Data

Dec. 24, 1996 (JP) .................................................. 8-344238

(51) Int. Cl.[7] .................................................... H04N 5/92
(52) U.S. Cl. ........................................... 386/112; 386/120
(58) Field of Search ............................... 386/46, 75, 95, 386/111, 112, 120, 121, 107, 117, 123, 124; 358/906; 348/384

(56) References Cited

U.S. PATENT DOCUMENTS 5,469,272 * 11/1995 Kubota et al. ........................ 386/75
5,659,654 * 8/1997 Nagasawa et al. ................... 386/120
5,691,767 * 11/1997 Tahara ................................. 348/384

* cited by examiner

Primary Examiner—Huy Nguyen
(74) Attorney, Agent, or Firm—Frommer, Lawrence & Haug, LLP.; William S. Frommer (57) ABSTRACT

A picture reproducing device in which a still picture can be recorded/reproduced to high picture quality without requiring a dedicated still picture processor or a RAM configured for storing picture data for processing by the dedicated still picture processor. Input video signals are all processed with DCT in a DCT/IDCT processor 4 as a continuous frame picture from one transform block to another and quantized by the quantizer/dequantizer 5 so as to be then recorded on a recording medium. Reproduced signals from the recording medium are dequantized by the quantizer/dequantizer 5 to give coefficient data which are processed with inverse DCT by the DCT/IDCT processor 4 to generate playback video signals. Responsive to the coefficient data based results of motion detection effectuated from one transform block to another, the playback video signals are outputted as playback video signals from the blocking shuffling/deblocking deshuffling processor 2. At this time, still picture blocks are outputted as a frame, while moving picture blocks are outputted as twice-outputted single-fields.

10 Claims, 7 Drawing Sheets

FIG.1

SOURCE CONTROL

| PC 0 | 0 | 1 | 1 | 0 | 0 | 0 | 0 | 1 |
|------|---|---|---|---|---|---|---|---|
| PC 1 | CGMS | | ISR | | GMP | | SS | |
| PC 2 | REC ST | 1 | REC MODF | | 1 | DISP | | |
| PC 3 | FF | FS | FC | IL | ST | SC | BCSYS | |
| PC 4 | 1 | GENRE CATEGORY | | | | | | |

HORIZONTAL →

↓ VERTICAL

| C00 | | | | | | | |
|-----|---|---|---|---|---|---|---|
| C10 | | | | | | | |
| C20 | | | | | | | |
| C30 | | | | | | | |
| C40 | | | | | | | |
| C50 | | | | | | | |
| C60 | | | | | | | |
| C70 | C71 | C72 | C73 | C74 | C75 | C76 | C77 |

EXAMPLE OF EXPANDING 525/60 MOTION PICTURE MB

FIG.7A

EXAMPLE OF EXPANDING 625/50 MOTION PICTURE MB

FIG.7B

RECORDING/REPRODUCING OF VIDEO SIGNALS, WITH VIDEO SIGNALS PLAYED BACK AS A FRAME OR A TWICE-OUTPUTTED SINGLE-FIELD DEPENDING ON WHETHER THE RECORDED SIGNALS ARE DIRECTED AS STILL OR MOVING PICTURES

BACKGROUND OF THE INVENTION

1. Field of the Invention

This invention relates to a picture recording/reproducing method and apparatus for recording/reproducing a still picture.

2. Description of Related Art

In a conventional digital video tape recorder for digital recording/reproducing of video data, one frame of picture signals from an imager or other picture input signals is stored on a random access memory (RAM), in which the one-frame picture data are split into 8 by 8 pixel blocks and shuffled with a pre-set number of blocks as a unit. The resulting data is orthogonal-transformed, such as by discrete cosine transform (DCT), and quantized for compressing the one-frame video data. The compressed video data is framed and deshuffled, that is processed with an operation reversed from shuffling, on the RAM, for restoration to the original data array. An outer parity and an inner parity for error correction are then appended to the resulting data and encoded for recording. The encoded data is then recorded on a video tape.

In the playback system, the playback signals from the video tape are decoded, that is processed with an operation reversed from the encoding, to produce playback data, which his then error-corrected on the RAM using the outer parity and the inner parity, and shuffled. The resulting shuffled data is deframed and dequantized and the resulting dequantized data is inverse-orthogonal-transformed for expanding the one-frame playback data. The expanded one-frame playback data are deshuffled, that is processed with an operation reversed from the shuffling, and deblocked, for reproducing the video data having the original pixel array.

Meanwhile, the picture signals of the standard television system, such as the National Television System Committee (NTSC) system or the Phase Alternation by Line (PAL) system, are interlaced signals. Therefore, if, in the above-described conventional digital video tape recorder, the input picture signals are stored as still pictures in a RAM for shuffling or deshuffling, and the still pictures are directly recorded/reproduced as contiguous frame pictures, the picture portions having a significant amount of motion represent field period deflection on reproduction.

If one of the even-numbered frame and the odd-numbered frame making up an original one frame picture×2 is recorded as one frame for possibly evading the above-mentioned field period deflection, vertical resolution is deteriorated.

If the recording system has a dedicated still picture processor configured for storing one-frame video data in a RAM and the amount of motion within one frame is found so that a picture portion with a small amount of motion is directly outputted as a frame and the picture portion with a significant amount of motion is outputted as repetition of one of the fields, still pictures free of field period deflection can be recorded for reproducing still pictures of high definition by any reproducing device. However, since the dedicated still picture processor and a RAM for storing the video data for processing by this still picture processor need to be provided in the recording system, the circuit scale of the recording system is prohibitively increased.

SUMMARY OF THE INVENTION

It is therefore an object of the present invention to provide a picture reproducing method and apparatus for recording/reproducing pictures of high picture quality without the necessity of providing a dedicated still picture processor or a RAM for storing the video data for processing by this still picture processor.

In one aspect, the present invention provides a picture recording/reproducing apparatus including a recording system for orthogonal-transforming input video signals in terms of a transform block as a unit, in which transform block has a pre-set number of two-dimensionally arrayed pixels, with all video input signals as a continuous frame picture. The recording system quantizes the orthogonal-transformed coefficient data and records the quantized coefficient data on a recording medium. The picture recording/reproducing apparatus also includes a reproducing system for inverse orthogonal-transforming the orthogonal-transformed coefficient data obtained on dequantizing the playback signals reproduced from the recording medium, for generating playback video signals, and effectuating motion detection from one transform block to another, based on the orthogonal-tranformed coefficient data. The reproducing system outputs playback video signals of a transform block, detected as being a still picture block, as a frame, while outputting playback video signals of a transform block, detected as being a moving picture block, as a twice-outputted single-field, thus enabling a high quality still picture to be outputted without requiring a dedicated still picture processor.

With the present picture recording/reproducing apparatus, the recording system has two sorts of the recording operation modes, that is a moving picture recording mode and a still picture recording mode. The recording system records the quantized orthogonal-tranformed coefficient data along with a flag indicating the recording operation mode on the recording medium during the still picture recording mode. The reproducing system also sets the still picture reproducing mode depending on the flag, and effects motion detection. The reproducing system outputs playback video signals of the transform block, detected as being a still picture block, as a frame, while outputting playback video signals of the transform block, detected as being a moving picture block, as twice-outputted single-field. This enables a high quality still picture to be outputted without requiring a dedicated still picture processor using the recording system having two recording operation modes, namely the moving picture recording mode and the still picture recording mode.

With the present picture recording/reproducing apparatus, motion detection can be performed from one transform block to another by comparing a value found from the distribution of respective coefficients of the orthogonal transform coefficient data obtained on dequantization to a pre-set threshold value.

With the present picture recording/reproducing apparatus, the reproducing system outputs, based on the results of detection by the motion detection means, two single-fields of playback picture signals of a macro-block containing a transform block detected as being a moving picture block.

With the present picture recording/reproducing apparatus, the reproducing system outputs, based on the results of detection by the motion detection means, two single-fields of playback picture signals of macro-blocks lying on upper and lower sides and on left and right sides of a macro-block containing a transform block detected as being a moving picture block.

In another aspect, the present invention provides a picture recording/reproducing method including orthogonal-transforming input video signals during recording in terms of a transform block as a unit, the transform block having a pre-set number of two-dimensionally arrayed pixels, with all video input signals as a continuous frame picture, the orthogonal-transformed coefficient data being quantized and recorded on a recording medium, inverse orthogonal-transforming the orthogonal-transformed coefficient data obtained on dequantizing the playback signals reproduced from the recording medium, during playback, for generating playback video signals, effectuating motion detection from one transform block to another, based on the orthogonal-tranformed coefficient data, such that playback video signals of a transform block, detected as being a still picture block, are outputted as a frame, while playback video signals of a transform block, detected as being a moving picture block, are outputted as a twice-outputted single-field. Thus, a still picture of high picture quality can be recorded/reproduced without requiring a dedicated still picture processor.

Also, with the picture recording/reproducing method according to the present invention, the quantized orthogonal-tranformed coefficient data are recorded during recording on the recording medium along with a flag specifying the recording mode and, during reproduction, motion detection is effected responsive to the flag. Based on the results of the motion detection, playback video signals of a transform block detected as being a still picture block are outputted as a frame, while playback video signals of a transform block detected as being a moving picture block are outputted as twice outputted single-field. Thus, if there are plural recording modes, a still picture of high picture quality can be recorded/reproduced without requiring a dedicated still picture processor.

With the picture recording/reproducing method according to the present invention, motion detection can be effectuated from one transform block to another by comparing a value found from the distribution of respective coefficients of the orthogonal transform coefficient data obtained on dequantization to a pre-set threshold value.

With the picture recording/reproducing method according to the present invention, two single-fields of playback picture signals of a macro-block containing a transform block detected as being a moving picture block are outputted based on the results of detection. Thus, it becomes possible to eliminate errors in motion detection and consequent lowering of the picture quality to record/reproduce a still picture of high picture quality.

Moreover, with the picture recording/reproducing method according to the present invention, two single-fields of playback picture signals of macro-blocks lying on upper and lower sides and on left and right sides of a macro-block containing a transform block detected as being a moving picture block are outputted based on the results of detection. The result is that it becomes possible to eliminate errors in motion detection and consequent lowering of the picture quality to record/reproduce a still picture of high picture quality.

DESCRIPTION OF PREFERRED EMBODIMENTS

Referring to the drawings, preferred embodiments of the present invention will be explained in detail.

Figure 1:
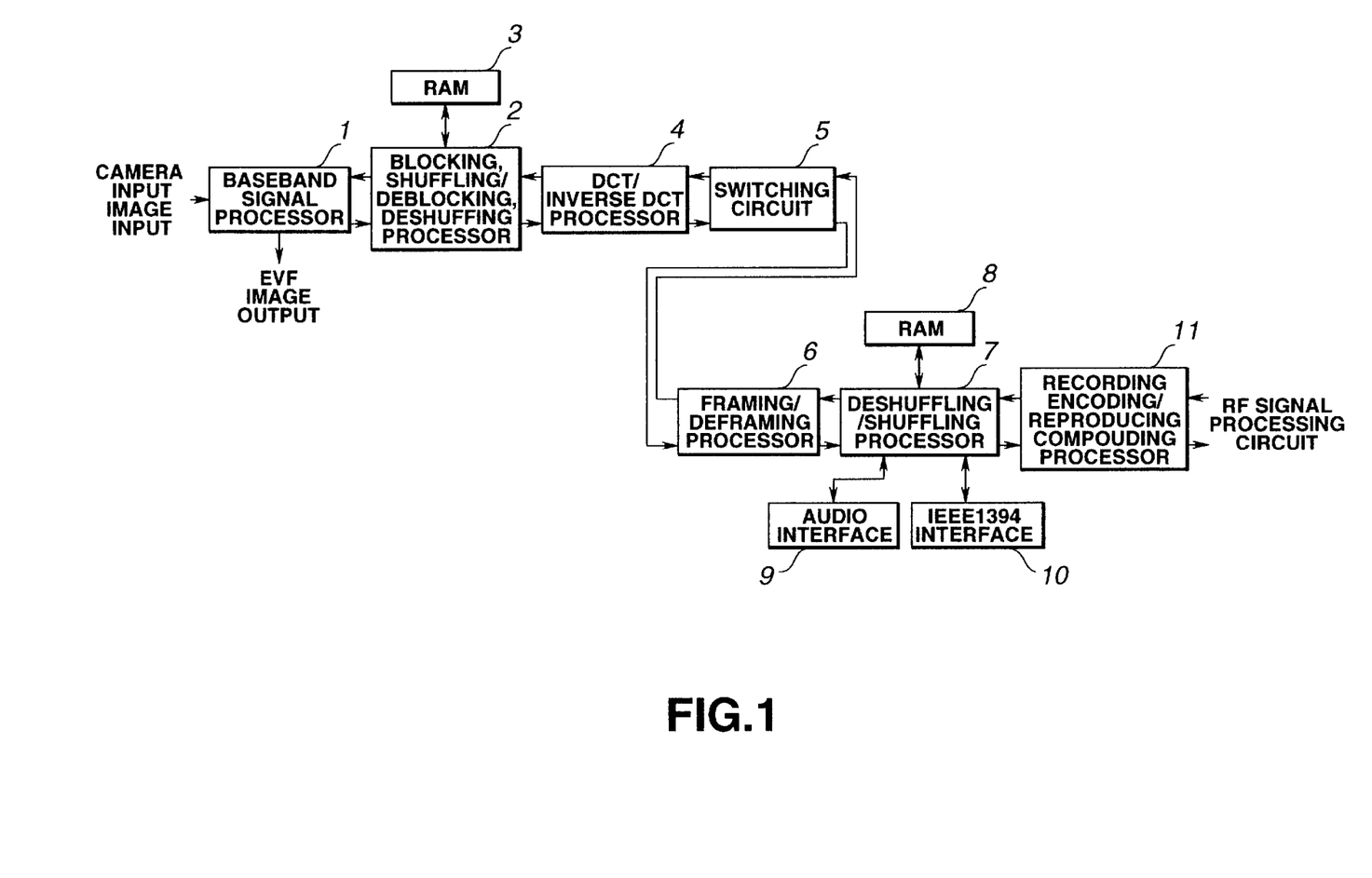
FIG. 1 is a block diagram showing the structure of a picture recording/reproducing apparatus according to the present invention.

FIG. 1 shows the structure of a picture recording/reproducing apparatus embodying the invention. The picture recording/reproducing apparatus shown in FIG. 1 is directed to a DVCR enabling synchronous/asynchronous communications by IEEE (The International of Electrical and Electronics Engineers, Inc.) 1394 high-performance serial bus. Specifically, the picture recording/reproducing apparatus includes a blocking-shuffling/deblocking-deshuffling processor 2, connected to a baseband signal processor 1, and a random access memory (RAM) 3 and a DCT/IDCT processor 4, both connected to the blocking shuffling/deblocking deshuffling processor 2. The picture recording/reproducing apparatus also includes a quantizer/dequantizer 5 connected to the DCT/IDCT processor 4, and a framing/deframing processor 6 connected to the quantizer/dequantizer 5. The picture recording/reproducing apparatus also includes a shuffling/deshuffling processor 7 connected to the framing/deframing processor 6 and a random access memory (RAM) 8 connected to the shuffling/deshuffling processor 7. The picture recording/reproducing apparatus further includes an audio interface 9, an IEEE 1394 interface 10 and a recording encoding/reproducing decoding processor 11.

The structure and the operation of the recording system in the present picture recording/reproducing apparatus is now explained.

In the present picture recording/reproducing apparatus, picture signals from an imager or other picture input signals are sent during recording via baseband signal processor 1 to the blocking shuffling/deblocking deshuffling processor 2, so that one-frame picture input signals for recording are stored in the RAM 3. If, during the still picture recording mode, the one-frame picture input signals, that is video data of a still picture, are stored in the RAM 3, the contiguous pictures of the frame of the still picture is transferred to the next stage.

The blocking shuffling/deblocking deshuffling processor 2 splits the one-frame video data on the RAM into 8-by-8 pixel blocks and shuffles the data in terms of a pre-set number of blocks as a unit to send the shuffled video data to the DCT/IDCT processor 4.

The DCT/IDCT processor 4 discrete cosine transforms the video data supplied from the blocking shuffling/deblocking deshuffling processor 2 to convert the video data into two-dimensional DCT coefficient data on the time axis, in terms of the 8-by-8 pixels as a unit, to send the resulting data to the quantizer/dequantizer 5.

The DCT/IDCT processor 4 in the present embodiment detects the motion for the moving picture recording mode, as conventionally, and handles video data by the 8×8 DCT mode for a block exhibiting only small field-to-field difference, while handling video data by the 2×4×8 DCT mode for a block exhibiting a larger field-to-field difference.

The quantizer/dequantizer 5 quantizes the video data, converted by the DCT/IDCT processor 4, into the two-dimensional DCT coefficients data on the time axis, for generating compressed video data.

The framing/deframing processor 6 frames video data supplied from the quantizer/dequantizer 5 to send the framed video data to the shuffling/deshuffling processor 7.

The shuffling/deshuffling processor 7 stores video data supplied from the framing/deframing processor 6 in the RAM 8 to process the video data on the RAM 8 with deshuffling which is the reverse operation of shuffling by the blocking shuffling/deblocking deshuffling processor 2. The shuffling/deshuffling processor 7 appends not only the auxiliary data (VAUX: video auxiliary data) but also an outer parity to the video data restored to the original array by the above-described deshuffling to send the resulting data to the recording encoding/reproducing decoding processor 11. The outer parity is appended in terms of the error check and correction (ECC) block as a unit. Moreover, the shuffling/deshuffling processor 7 appends the outer parity to the audio data entered via audio interface 9, in terms of the ECC block as a unit, to send the resulting data to the recording encoding/reproducing decoding processor 11.

The recording encoding/reproducing decoding processor 11 also appends the inner parity for error check and correction (ECC) to the ECC block based video data or audio data, supplied from the shuffling/deshuffling processor 7, and encodes the resulting data in a manner suited for recording, for generating recording signals for recording the recording signals via a recording/reproducing unit, not shown, on a video tape.

Figure 2:
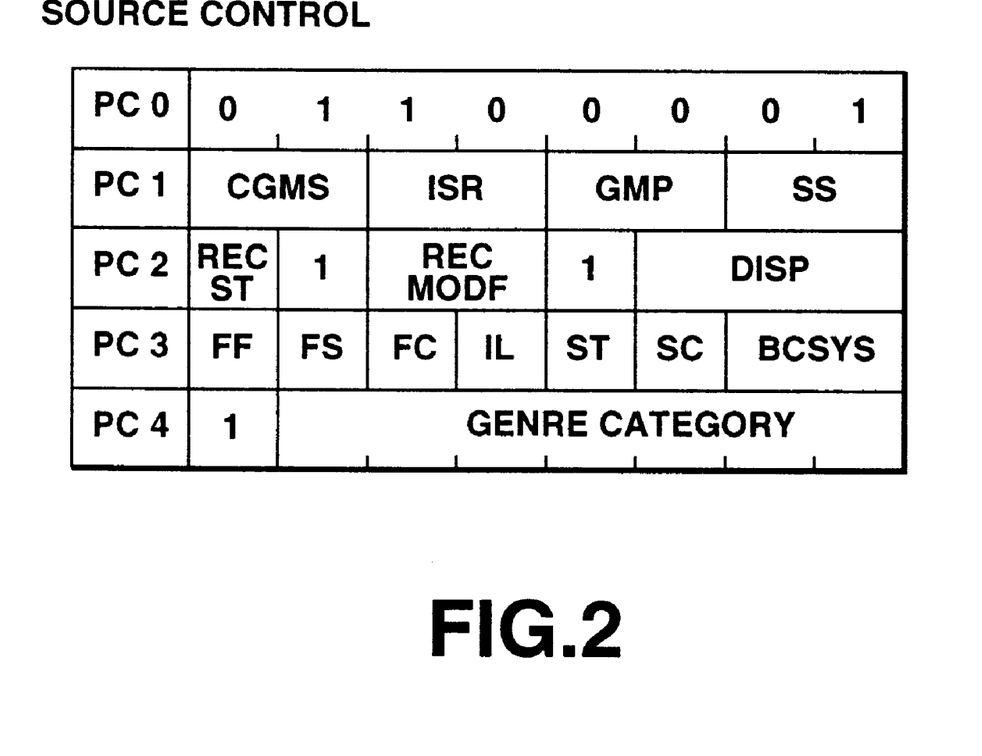
FIG. 2 shows the structure of appended data VAUX making up an ECC block along with video data recorded and/or reproduced by the picture recording/reproducing apparatus.

The video recording/reproducing apparatus records, along with the video data, system data of a pack structure comprised of pack data (PC0) and pack data (PC1 to PC4), as auxiliary data VAUX making up an ECC block along with the video data, as shown in FIG. 2. The auxiliary data VAUX, the pack header PC0 of which is '0110001', is a SOURCE_CONTROL pack, and gives an FF (frame/field) flag, a FS (First/Second) flag, a FC (Frame change) flag, an I1 (Interface) flag, a ST (Still-field picture) flag and a SC (Still camera picture) flag by its pack data (PC3). The above FF flag indicates whether only one field is outputted twice during one frame period (FF=0) or both fields are outputted during one frame period (FF=1). The FS flag indicates whether the first field is outputted (FF=1) or the second field is outputted (FS=1). The FC flag indicates whether the current frame is the same as (FC=0) or differs from (FC=1) the directly previous frame. The IL flag indicates whether data of two fields of a frame are interlaced (IL=1) or not (ILL=0). The ST flag indicates whether the time distance between two fields in a frame in approximately zero sec (ST=0) or corresponds to the field period in the 526-60 system or the 625-50 system (ST=1). In addition, the SC flag indicates whether the image is taken by a still camera (SC=1) or otherwise (SC=1).

In the present embodiment, the ST flag indicates the time distance between two fields in a frame of approximately zero, that is a still picture, by ST=0, while indicating a moving picture having a time distance corresponding to the field period in the 525-60 system or the 625-50 system by ST=1. In the still picture recording mode, the ST flag of the SOURCE_CONTROL pack of the auxiliary data VAUX of the still picture data portion is set to 1 for recording.

In the present picture recording/reproducing device, picture data of a still image are stored in the RAM 8 of the shuffling/deshuffling processor 7 and, with the write/readout direction of the blocking shuffling/deblocking deshuffling processor 2 reversed, the picture data of the RAM3 is outputted to the baseband signal processor 1 to permit the recorded still image to be monitored on an electronic view finder or an image output.

The structure and the operation of the reproducing system of the present picture recording/reproducing apparatus is now explained.

With the present picture recording/reproducing apparatus, playback signals reproduced from a video tape via a recording/reproducing unit, not shown, is set to the recording encoding/reproducing decoding processor 11.

The recording encoding/reproducing decoding processor 11 processes the playback signal with decoding, as a counterpart operation of encoding during recording, for generating playback data. The recording encoding/reproducing decoding processor 11 also processes the playback data with error correction and decoding by the inner parity to supply the error-corrected playback data to the shuffling/deshuffling processor 7.

The shuffling/deshuffling processor 7 stores the playback data supplied from the recording encoding/reproducing decoding processor 11 in the RAM 8 on which the processor 7 processes the ECC block based playback data with error correction by an outer parity. The playback audio data of the error-corrected playback data is outputted via audio interface 9. The shuffling/deshuffling processor 7 also processes the playback video data with shuffling similar to that performed during recording by the blocking shuffling/deblocking deshuffling processor 2 to send the shuffled playback video data to the framing/deframing processor 6.

The framing/deframing processor 6 deframes the playback picture data supplied from the deshuffling/shuffling processor 7 to send the deframed data to the quantizer/dequantizer 5. The playback picture data, obtained from the framing/deframing processor 6, correspond to picture data converted during recording by the DCT/IDCT processor 4 into time-domain two-dimensional DCT coefficient data and which are then quantized by the quantizer/dequantizer 5.

The quantizer/dequantizer 5 dequantizes the playback picture data obtained by the framing/deframing processor 6 to reproduce the time-domain two-dimensional DCT coefficient data to send the reproduced data to the DCT/IDCT processor 4.

In the picture recording/reproducing apparatus of the present embodiment, the operating mode is switched, during reproduction, based on the ST flag of a SOURCE_CONTROL pack of auxiliary data VAUX of a data portion of the still picture, recorded as the auxiliary data VAUX constituting the ECC block along with the video data, so that the operating mode is switched to the still picture reproducing mode when the ST flag is "1". The two-dimensional DCT coefficient data from the framing/deframing processor 6 is sent to the DCT/IDCT processor 4.

Figure 3:
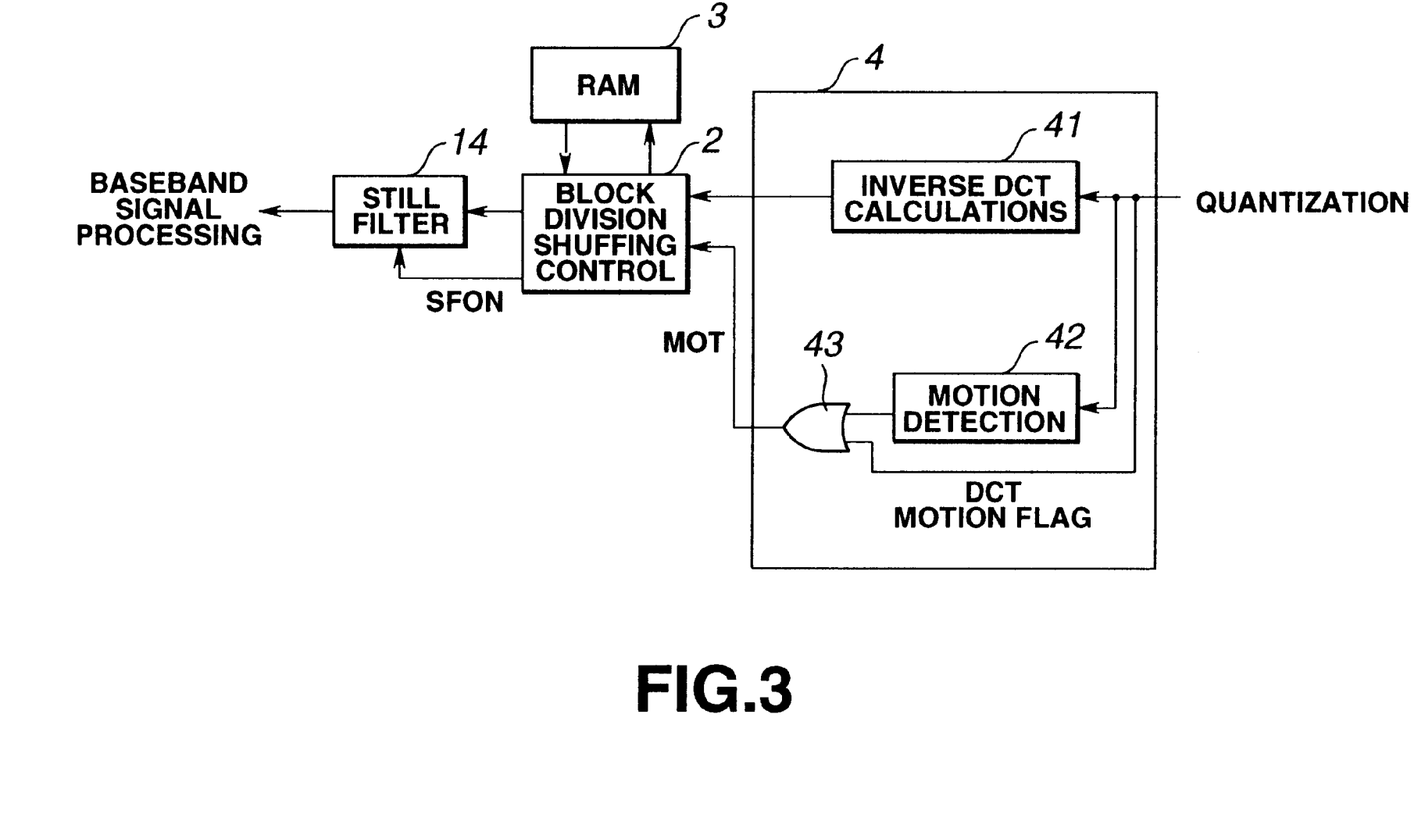
FIG. 3 is a block diagram showing the structure of a reproducing side of DCT/IDCT processor in the above picture recording/reproducing apparatus.

Referring to FIG. 3, the DCT/IDCT processor 4 includes an inverse DCT processor 41, a motion detection 42 and an OR gate 43 and processes the 8×8 time-domain two-dimensional DCT coefficient data by the inverse DCT processor 41 by inverse DCT to output resulting video data. The DCT/IDCT processor 4 also performs, by the motion detector 42, the so-called motion detection of detecting whether the DCT block is a moving picture block or a still picture block, based on the above-mentioned two-dimensional DCT coefficient data, for outputting a motion detection flag MOT via OR gate 43.

Figure 4A:
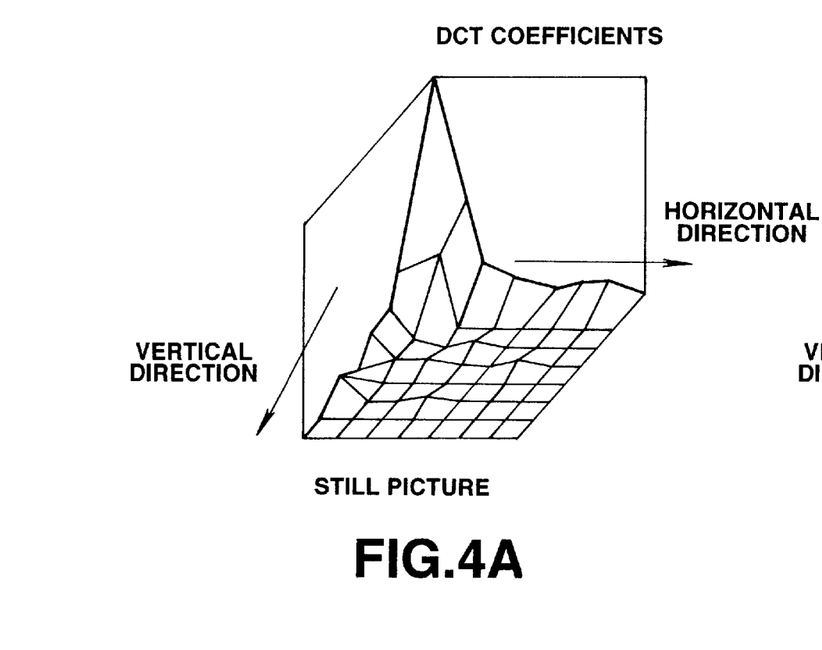
FIGS. 4A and 4b illustrate an example of the state of distribution of DCT coefficients for still and moving pictures.
Figure 4B:
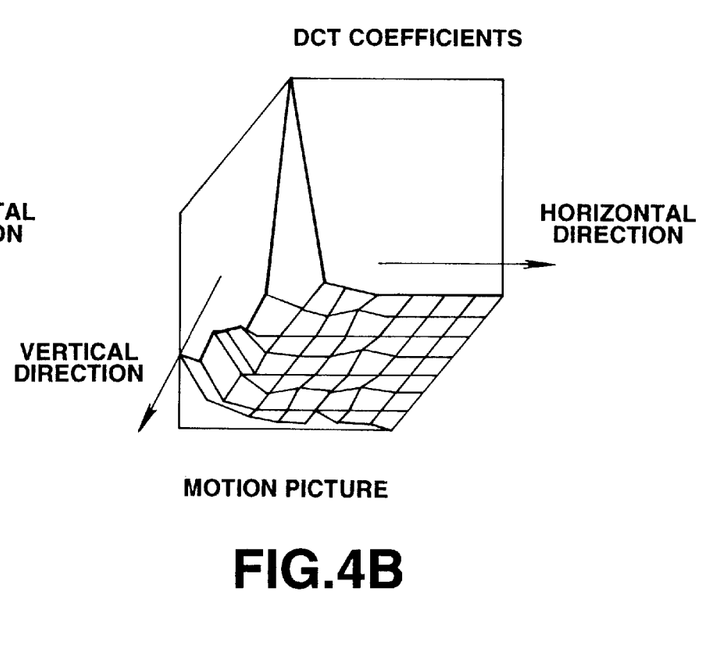

As may be seen from FIGS. 4A and 4B showing the state of distribution of the DCT coefficients for a still picture and that for a moving picture, the moving picture has a significant field-to-field difference, so that the high-range coefficients of the moving picture in the vertical direction tend to be increased as compared to those in the horizontal direction. The motion detector 42 exploits this tendency to effect motion detection by comparing the sum total of the coefficients and the peak values as found from the distribution of the coefficients to the pre-set threshold values.

Figure 5:
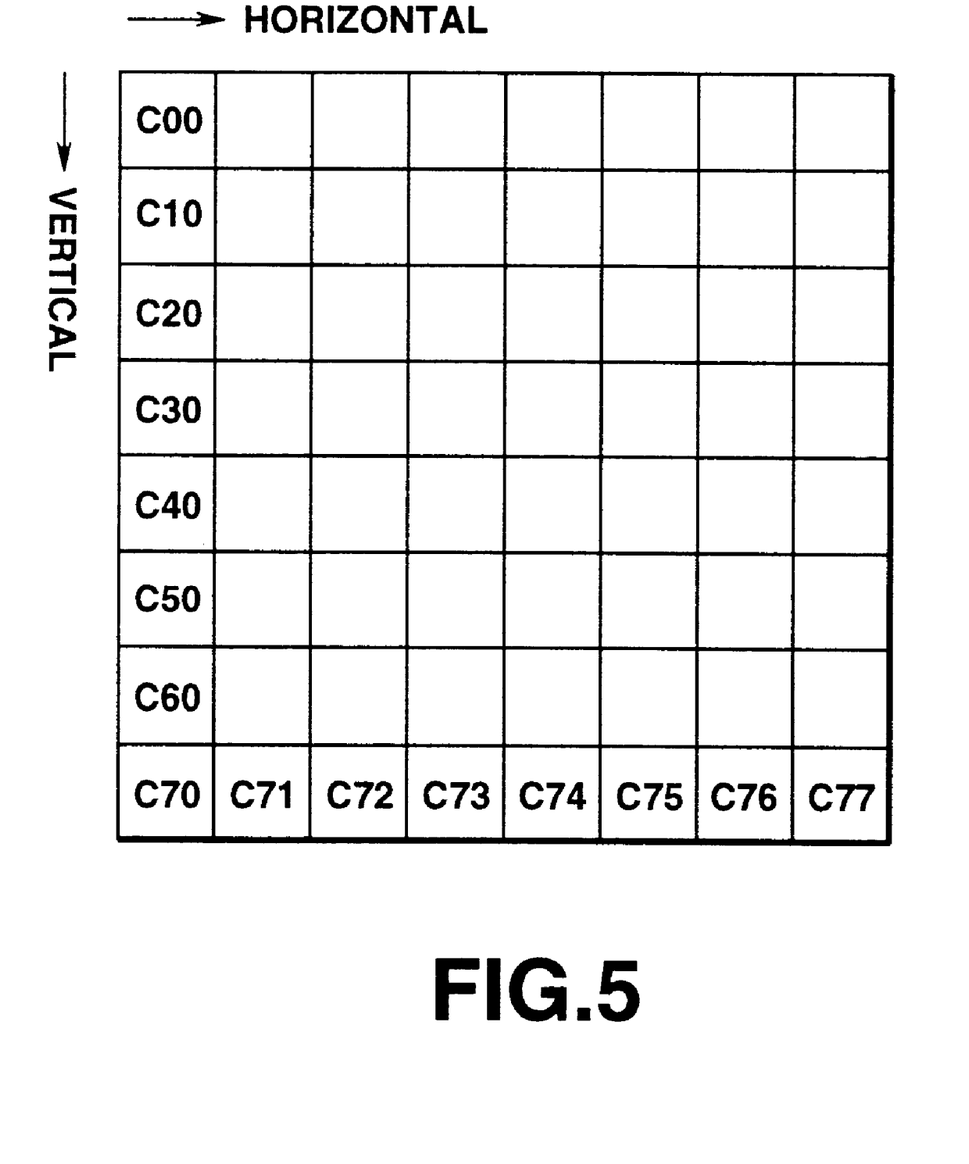
FIG. 5 illustrates an example of DCT coefficients used for motion detection by a motion detection unit in the DCT/IDCT processor.

For example, the motion detection in case the DCT coefficients are C00 to C77 as shown in FIG. 5 is effectuated by the equation:

$$\text{motion} = \left(\sum_{i=0}^{7}|C_{7i}^*|\right) A \, \&((\max|C_7 x| - \min|C_{7x}|)B) \, \&$$

$$(|C_{10}|\langle(|C_{50}| + |C_{60}| + |C_{70}|))$$

That is, a picture is judged to be a moving picture when the following three conditions are met simultaneously.
(1) That the sum total of absolute values of coefficients from C70 to C77 be not less than a threshold value A;
(2) that the maximum difference of the coefficients from C70 to C77 be not less than a threshold value B; and
(3) that the sum of absolute values of C50, C60 and C70 be larger than the absolute value of C10.

The video data, obtained on inverse DCTing the time-domain two-dimensional DCT coefficient data by the DCT/IDCT processor 4, is sent to the blocking shuffling/deblocking deshuffling processor 2 along with a motion detection flag MOT, specifying whether each DCT block is a moving picture block or a still picture block.

The blocking shuffling/deblocking deshuffling processor 2 stores one-frame video data of the video data supplied from the DCT/IDCT processor 4 in the RAM 8 on which to process the vide data with deshuffling processing which is a reverse operation of the shuffling performed by the shuffling/deshuffling processor 7. This shuffling/deshuffling processor 7 controls the outputting of the video data, restored to the original array by the above-described deshuffling, so that the video data of the still picture blocks is directly outputted as the existing frame via baseband signal processor 1, while the video data of the moving picture block is outputted as the same field×2 via baseband signal processor 1.

Thus, in the picture recording/reproducing apparatus of the instant embodiment, one-frame video data is stored in the RAM during reproduction to find the amount of the motion in one frame and a portion having a small amount of motion is directly outputted as a frame, while a portion having more motion is outputted as two single-fields, thus enabling a still picture of a high picture quality to be recorded/reproduced without requiring a dedicated still picture processor.

When outputting video data of the moving picture block portion as single-field×2, the blocking shuffling/deblocking deshuffling processor 2 outputs video data of the moving block portion via still filter 14 by single-field×2 to the baseband signal processor 1, as shown in FIG. 3, for suppressing line-flicker by the still flicker 14, for further improving the picture quality.

Figure 6A:
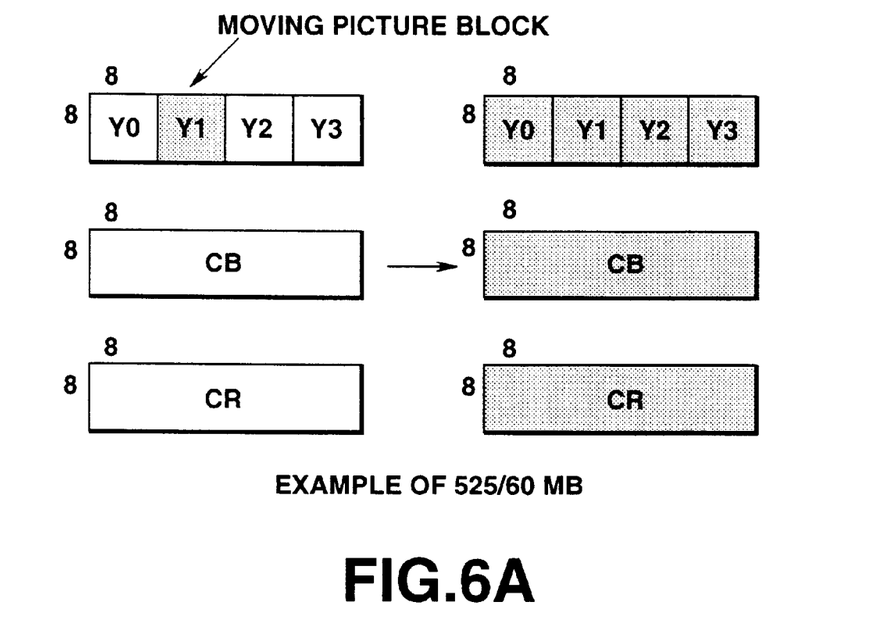
FIGS. 6A and 6B illustrate a macro-block of video data reproduced by the picture recording/reproducing apparatus.
Figure 6B:
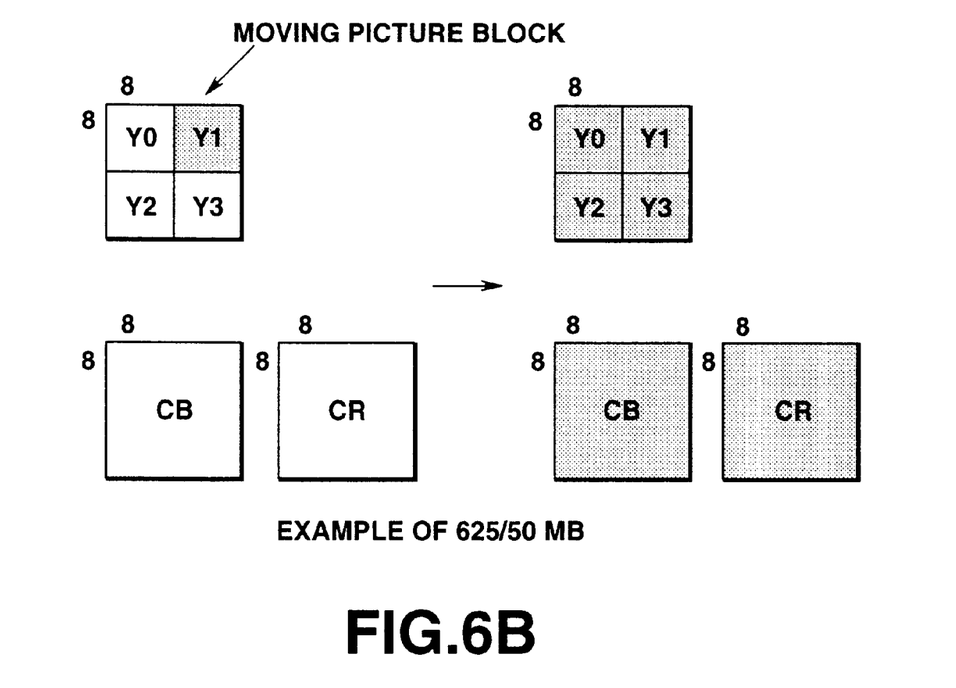
Figure 7A:
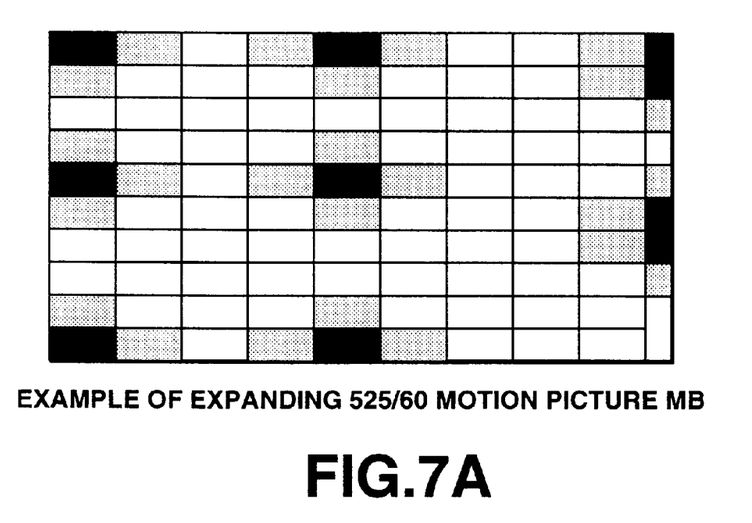
FIGS. 7A and 7B illustrate two examples of expansion of macro-blocks.
Figure 7B:
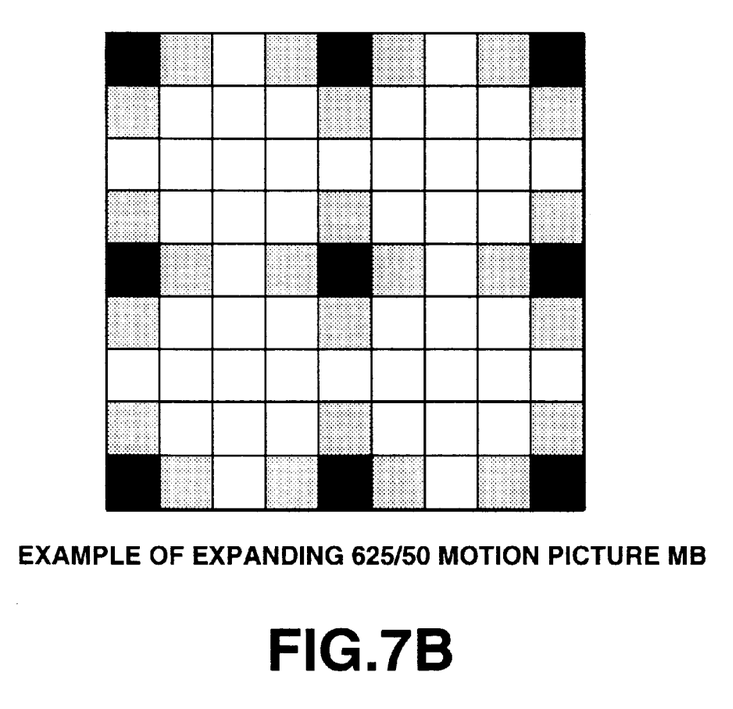

If solely the motion detection by the DCT coefficients is used, there is a possibility of leakage of motion detection, that is the possibility of detecting a picture having motion as being a still picture block. Thus, the following processing may further be used
(a) If a macro-block should contain a DCT block detected as being a moving picture block, the remaining DCT blocks are similarly handled as being moving picture blocks, as shown netted in FIGS. 6A and 6B; and
(b) if a macro-block should contain a DCT block detected as being a moving picture block, the DCT blocks lying on upper and lower sides and on the left and right sides of the DCT block detected as being a moving picture block are similarly handled as being moving picture blocks, as shown netted in FIGS. 7A and 7B.

The above processing can be carried out in the blocking shuffling/deblocking deshuffling processor 2.

What is claimed is:
1. A picture recording/reproducing apparatus comprising:
a recording system for orthogoanl-transforming input video signals in terms of a transform block as a unit, said transform block having a pre-set number of two-dimensionally arrayed pixels, with all video input signals as a continuous frame picture, said recording system quantizing orthogonal-transformed coefficient data and recording the quantized coefficient data on a recording medium; and
a reproducing system for inverse orthogonal-transforming the orthogonal-tranformed coefficient data obtained by dequantizing playback signals reproduced from the recording medium, for generating playback video signals, effectuating motion detection from one transform block to another transform block, based on the orthogonal-tranformed coefficient data, said reproducing system outputting playback video signals of a transform block, detected as being a still picture block, as a frame, said reproducing system also outputting playback video signals of a transform block, detected as being a moving picture block, as a twice-outputted single-field.

2. The picture recording/reproducing apparatus as claimed in claim 1 wherein said recording system has two recording operation modes, a moving picture recording mode and a still picture recording mode, and wherein the quantized orthogonal-tranformed coefficient data along with a flag indicating the recording operation mode are recorded on the recording medium during the still picture recording mode;
said reproducing system setting a still picture reproducing mode depending on said flag, and effecting said motion detection, said reproducing system outputting playback video signals of the transform block, detected as being a still picture block, as a frame, said reproducing system also outputting playback video signals of the transform block, detected as being a moving picture block, as a twice-outputted signal field.

3. The picture recording/reproducing apparatus as claimed in claim 1 wherein said reproducing system includes motion detection means for effecting motion detection from one transform block to another by comparing a value found from the distribution of respective coefficients of the orthogonal transformed coefficient data obtained on dequantization to a pre-set threshold value.

4. The picture recording/reproducing apparatus as claimed in claim 3 wherein said reproducing system outputs, based on the results of detection by said motion detection means, two single-fields of playback video signals of a macro-block containing a transform block detected as being a moving picture block.

5. The picture recording/reproducing apparatus as claimed in claim 4 wherein said reproducing system outputs, based on the results of detection by said motion detection means, two single-fields of playback video signals of macro-blocks lying on upper and lower sides and on left and right sides of a macro-block containing a transform block detected as being a moving picture block.

6. A picture recording/reproducing method comprising:

orthogonal-transforming input video signals during recording in terms of a transform block as a unit, to produce orthogonal-tranformed coefficient data, said transform block having a pre-set number of two-dimensionally arrayed pixels, with all video input signals as a continuous frame picture, said orthogonal-tranformed coefficient data being quantized and recorded on a recording medium; and inverse orthogonal-transforming the orthogonal-tranformed coefficient data obtained by dequantizing the playback signals reproduced from the recording medium, during playback, for generating playback video signals, effecting motion detection from one transform block to another block, based on the orthogonal-tranformed coefficient data, such that playback video signals of a transform block, detected as being a still picture block, are outputted as a frame, while playback video signals of a transform block, detected as being a moving picture block, are outputted as a twice-outputted single-field.

7. The picture recording/reproducing method as claimed in claim 6 wherein, during recording, the quantized orthogonal-tranformed coefficient data are recorded on the recording medium along with a recording mode specifying flag; and wherein during reproduction, said motion detection is effected responsive to said flag and, based on the results of the motion detection, playback video signals of a transform block detected as being a still picture block are outputted as a frame and playback video signals of a transform block detected as being a moving picture block are outputted as twice outputted single-field.

8. The picture recording/reproducing method as claimed in claim 6 wherein, during reproducing, motion detection is effectuated from one transform block to another by comparing a value found from the distribution of respective coefficients of the orthogonal transformed coefficient data obtained on dequantization to a pre-set threshold value.

9. The picture recording/reproducing method as claimed in claim 8 wherein, based on the results of detection, two single-fields of playback video signals of a macro-block containing a transform block detected as being a moving picture block are outputted.

10. The picture recording/reproducing method as claimed in claim 9 wherein, based on the results of detection, two single-fields of playback video signals of macro-blocks lying on upper and lower sides and on left and right sides of a macro-block containing a transform block detected as being a moving picture block are outputted.

* * * * *